H. O. V. BERGSTRÖM.
PROCESS OF DISTILLATION.
APPLICATION FILED DEC. 23, 1905.

953,019.

Patented Mar. 29, 1910.

Witnesses
M. Levy
H. D. Penney

Inventor
H. O. V. Bergström
By his Attorney, F. H. Richards.

UNITED STATES PATENT OFFICE.

HILDING OLOF VIDAR BERGSTRÖM, OF STOCKHOLM, SWEDEN.

PROCESS OF DISTILLATION.

953,019.	Specification of Letters Patent.	Patented Mar. 29, 1910.

Application filed December 23, 1905. Serial No. 293,055.

*To all whom it may concern:*

Be it known that I, HILDING OLOF VIDAR BERGSTRÖM, engineer, a subject of the King of Sweden, residing in Jernkontoret, Kungsträdgårdsgatan 4, Stockholm, Sweden, have invented certain new and useful Improvements in Processes of Distillation, of which the following is a specification.

The present invention relates to a method for boiling, evaporation or distillation of the condensed products of distillation produced in charring or dry distillation of wood, peat and the like organic matters, according to which method the heat of the vapors or gaseous products of distillation generated during the charring or distilling is utilized for said purpose.

The object of the invention is to utilize in a more economic manner than heretofore the heat of the vapors or gaseous products of distillation generated through dry distillation, carbonizing or charring of wood, peat and the like organic matters. The vapors or gases that issue from the kiln or retort where the charring process is going on contain, however, more heat than is theoretically necessary for the distillation of the raw pyroligneous acid emanating from the same kiln or retort. In order to utilize the heat of said vapors o gases, the volatile products generated in the kiln  retort where the charring or distillation p ess is going on, are, according to the present invention, passed through a heating element of suitable construction arranged in a distilling vessel or a boiler con ini..g raw pyroligneous acid or other condensed or liquid products resulting from the distillation of wood, peat or similar organic matters. In the said vessel or boiler the distillation is carried out with the aid of vacuum.

In order to make the invention clearer it is described in the following manner with reference to the accompanying drawing, forming part of this specification, on which drawing—

Figure 1:
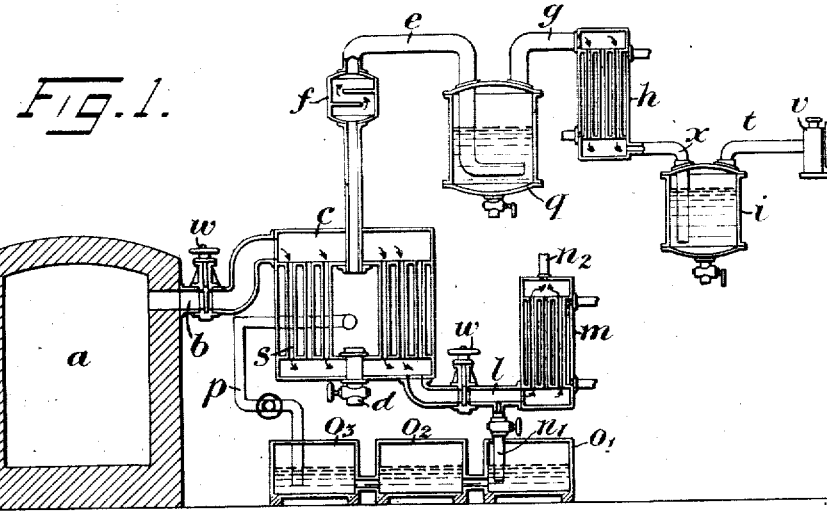
Figure 2:
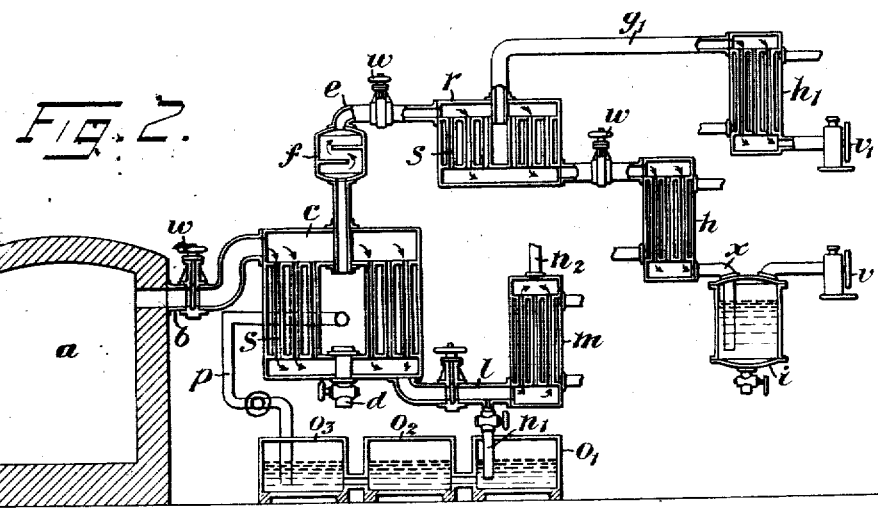

Figure 1 is a sectional view of a suitable apparatus for carrying out the method or process, and Fig. 2 is a sectional view of a somewhat modified form of the said apparatus.

$a$ is the kiln or retort in which the charring or dry distillation of wood, peat or the like is carried out. $b$ is a pipe or passage through which the vapors or gaseous products generated during the charring process pass out from said kiln or retort into a heating element $s$ of any suitable construction, arranged in a vacuum boiler, indicated by $c$. In this apparatus or vessel the liquid to be distilled, consisting, for instance, of the raw pyroligneous acid received from an earlier charring or carbonizing process, is introduced. This apparatus or vessel is as usual provided with a discharge pipe $d$, provided with a valve or the like, for drawing off those matters contained in the raw pyroligneous acid; as, for instance, tar and the like, that are not evaporated through the influence of the temperature and vacuum that exist in the said distilling apparatus. Furthermore, the said apparatus is provided with a pipe or passage $e$ for drawing off the gases or vapors generated in the said apparatus. In connection with this pipe $e$ there is also arranged an apparatus $f$ of suitable construction for separating liquid particles mechanically entrained by the vapors or gases generated in the distilling apparatus. The said gases or vapors generated in the vacuum boiler pass through said pipe $e$ into a closed receptacle $g$, containing milk of lime or other substances suitable for absorbing or combining with the acetic acid. The acid products are thus absorbed or retained in the said receptacle $g$, but the rest of the gases or vapors pass from the receptacle $q$, through a pipe $g$, to a condenser $h$, and t e products condensed in said condenser, consisting chiefly of diluted wood spirits and aceton, are then collected in a closed receptacle $i$, connected with the condenser by means of a pipe $x$. The gases that are not condensable pass out from this latter receptacle through the pipe $t$, which pipe is connected with a suction pump $r$, which thus exhausts the gases from the distillation apparatus through the pipes $e$, $g$, $x$ and $t$, so that the distilling process is going on under vacuum in said apparatus.

The gases and vapors generated in the kiln or retort $a$ during the charring process while passing through the heating element $s$ give off heat to said element and part of them are thereby condensed, while on the other hand by means of the heat thus given off the liquid to be distilled in the distilling apparatus $c$ becomes heated and evaporates or boils. The products flowing through the heating element, as well as those which are condensed therein, and the uncondensed gases flow from the heating element through the pipe or passage $l$ to the condenser $m$, where a part of the gaseous products are condensed. From the said condenser $m$ the condensed products pass through a pipe $n^1$ to a series of receptacles $o^1$, $o^2$ and $o^3$, while the uncondensed products are carried away from the condenser through the pipe $n^2$ and may be used for fuel or firing purposes. The products condensed in the heating element $s$ also flow through the pipe $n^1$ to the said receptacles $o^1$, $o^2$, $o^3$. $w$ are valves by means of which the respective pipes or passages where they are inserted may at will be opened or closed. In these receptacles $o^1$, $o^2$, $o^3$ the several condensed products separate by reason of their different specific weight. A part of said products consists of raw pyroligneous acid, which, on account of its specific weight, becomes separated in the said receptacles from oil and tar and such substances. This pyroligneous acid is carried up from the receptacle by suitable means, for instance, from the receptacle $o^3$ through the pipe $p$, and introduced into the distilling apparatus or vacuum boiler $c$, where it is (in the manner hereinbefore stated, through the influence of the heat of the gaseous products of distillation issuing from the kiln or retort $a$, through the action of the heating element $s$) heated whereby a part of the said liquid is evaporated and the vapors thus generated flow off through the pipe $e$ and, as before stated, pass into the liquid, milk of lime or the like, contained in the receptacle $q$, where the acetic acid is united or combined with lime and a solution of acetate of lime formed, while the other products flow on from the receptacle $q$ through the pipe $g$ to the condenser $h$. The products condensed in said condenser $h$ are collected in the receptacle $i$ and are treated for the production of wood spirits, and the uncondensed products pass from this receptacle through the pipe $t$, which is, as above stated, connected with a suction pump. It is to be understood that the receptacle $q$ may be omitted, in which case all condensable products, and also the acid products issuing from the vessel $c$ after passing the condenser $h$, are collected in the receptacle $i$.

In the apparatus shown in Fig. 2 the receptacle $q$ is omitted. In this form of the apparatus a vacuum boiler $r$, may be interposed between the vacuum boiler $c$ and the condenser $h$ in such a way that the steam or gases issuing from the vacuum boiler $c$ pass through the heating element of the said vacuum boiler $r$, whereby at least a part of said steam or gases are condensed, thereby giving off their heat of condensation to said heating element, so that the solutions, consisting, for instance, of wood spirit or a solution of acetate of lime introduced in said vacuum boiler $r$, are distilled.

The gases that are not condensed when passing the heating element of the boiler pass to the condenser $h$ and therefrom the products are carried off in the same manner as above stated with reference to Fig. 1. The gaseous products generated in the vacuum boiler $r$ pass through the pipe $g^1$ and the condenser $h^1$, from which latter the condensed products pass through suitable pipes, (not shown,) while the uncondensed products are drawn off by means of the suction pump $t^1$. It will be readily seen that the heat of the gases and vapors issuing from the retort or kiln where the charring process is going on, without departing from the idea of this invention, may also be utilized for the heating or distillation of liquid products received from the charring process other than the raw pyroligneous acid. Thus, for instance, it may be used for evaporation of solutions of calcium acetate, which is received through absorption of the acetic acid in the milk of lime, rectification of wood spirits, or distillations of oils, tar and other products, resulting from charring or distillation of wood, peat or the like organic substances, which products for the said purpose are then introduced into the vacuum boiler or boilers $c$.

By means of the present invention the following advantages are gained over the methods heretofore used. The fuel necessary for purification of the products of distillation is reduced about fifty per cent., and also the number of steam boilers necessary may be reduced about fifty per cent. of what is necessary according to former methods. The quantity of water necessary for condensation of the products of distillation issuing from the coaling kiln or retort is reduced about seventy-five per cent. or more, depending on the manner in which the distillation is carried out. Although these advantages are gained, the cost of establishing or equipping a factory according to the present invention are considerably less than the equipment of a factory of the same capacity according to former systems.

Having thus described my invention, I declare that what I claim is:

1. The process of utilizing the heat from the vapors or gaseous products of the carbonizing or dry distillation of wood, peat and similar organic materials, consisting in leading such vapors or gaseous products through the heating element of a vacuum boiler that contains the condensed or liquid products of such distillation, whereby the said liquid products are vaporized or have vapors driven off therefrom by the heat of the said gaseous products led through said heating element, while at the same time the said gaseous products become condensed, thereupon leading the products condensed in the heating or conveying element to a series of receptacles, where the products will separate according to their specific weights, and leading the condensed products or solutions from such receptacles into the said vacuum boiler for further distillation by the heat from the said heating element.

2. The process of utilizing the heat from the vapors or gaseous products of the carbonizing or dry distillation of wood, peat and similar organic materials, consisting in leading such vapors or gaseous products through the heating element of a vacuum boiler that contains the condensed or liquid products of such distillation, whereby the said liquid products are vaporized or have vapors driven off therefrom by the heat of the said products led through said heating element, while at the same time the said products become condensed, thereupon leading the vapors and liquid products from the vacuum boiler into a vessel containing milk of lime or other suitable solution whereby the acid products are absorbed, and thereupon leading the gases not absorbed in the latter vessel into a condenser to collect the remaining condensable products.

3. The process of utilizing the heat from the vapors or gaseous products of the carbonizing or dry distillation of wood, peat and similar organic materials, consisting in leading such vapors or gaseous products through the heating element of a vacuum boiler that contains the condensed or liquid products of such distillation, whereby the said liquid products are vaporized or have vapors driven off therefrom by the heat of the said gaseous products led through said heating element, while at the same time the said gaseous products become condensed, thereupon leading the vapors and gaseous products from the vacuum boiler into a vessel containing milk of lime or other suitable solution whereby the acid products are absorbed, and thereupon leading the gases not absorbed in the latter vessel into a condenser to condense and collect the remaining condensable products, the products condensed in the heating or conveying element being at the same time passed to a series of receptacles, where the products will separate according to their specific weights, and leading the condensed products or solutions from such receptacles into the said vacuum boiler for further distillation by the heat from the said heating element.

4. The process of utilizing the heat from the vapors or gaseous products of the carbonizing or dry distillation of wood, peat and similar organic materials, consisting in leading such vapors or gaseous products through the heating element of a vacuum boiler that contains the condensed or liquid products of such distillation, whereby the said liquid products are vaporized or have vapors driven off therefrom by the heat of the said gaseous products led through said heating element, while at the same time the said gaseous products become condensed, thereupon leading the vapors and gaseous products generated in the vacuum boiler through the heating element of another vacuum boiler containing condensed or liquid products of said distillation of wood, peat and the like, which are thereby heated or evaporated, thereupon leading the vapors that are not condensed in the heating element of the last mentioned vacuum-boiler to a condenser to be condensed and collected while the products condensed in said heating element are led off and collected.

In witness whereof, I have hereunto set my hand in presence of two witnesses.

HILDING OLOF VIDAR BERGSTRÖM.

Witnesses:
   AUG. HAGDIN,
   ALMA PETTERSSON.